May 12, 1959

R. E. SPRAGUE ET AL 2,886,243

INCREMENTAL SLOPE FUNCTION GENERATOR

Filed Dec. 19, 1949

INVENTORS:
RICHARD E. SPRAGUE
DONALD E. ECKDAHL
BY
Hubert E. Metcalf
ATTORNEY

INVENTORS:
RICHARD E. SPRAGUE
DONALD E. ECKDAHL
BY Hubert E. Metcalf
ATTORNEY

May 12, 1959  R. E. SPRAGUE ET AL  2,886,243
INCREMENTAL SLOPE FUNCTION GENERATOR
Filed Dec. 19, 1949  7 Sheets-Sheet 5

Fig. 6

INVENTORS
RICHARD E. SPRAGUE
DONALD E. ECKDAHL
BY
Hubert E. Metcalf
ATTORNEY

May 12, 1959     R. E. SPRAGUE ET AL     2,886,243
INCREMENTAL SLOPE FUNCTION GENERATOR
Filed Dec. 19, 1949     7 Sheets-Sheet 6

INVENTORS:
RICHARD E. SPRAGUE
DONALD E. ECKDAHL
BY
Herbert E. Metcalf
ATTORNEY

May 12, 1959 R. E. SPRAGUE ET AL 2,886,243
INCREMENTAL SLOPE FUNCTION GENERATOR
Filed Dec. 19, 1949 7 Sheets-Sheet 7

INVENTORS:
RICHARD E. SPRAGUE
DONALD E. ECKDAHL
BY
Herbert E. Metcalf
ATTORNEY

United States Patent Office 2,886,243
Patented May 12, 1959

2,886,243

INCREMENTAL SLOPE FUNCTION GENERATOR

Richard E. Sprague, Redondo Beach, and Donald E. Eckdahl, Manhattan Beach, Calif., assignors to Northrop Aircraft, Inc., Hawthorne, Calif., a corporation of California Application December 19, 1949, Serial No. 133,817

16 Claims. (Cl. 235—197)

This invention relates to function generators and more particularly to an electronic means of generating any function of time by the use of incremental slopes.

In control systems for the automatic navigation of missiles, for example, it is desirable to maintain a steady flight according to predetermined instructions originating outside of the control mechanism. These instructions, which may be expressed originally in the form of a mathematical equation, or an arbitrary function of time, must be converted into a stream of properly spaced pulses in order to put the information in a form useful for feeding into the electrical control mechanism which operates to physically establish the desired relationship between components of the system, for example.

It is therefore an object of this invention to provide a means of converting a mathematical function of time into an electrical pulse-time representation.

Control instructions or functions used in conjunction with celestial navigation systems, such as, for example, the altitude angle function of chosen stars along a specified trajectory, may be mathematically expressed in the form of differential equations of motion which do not yield to direct integration and are not readily solved by ordinary computer elements. In fact, the solution of the differential equations may be of such a nature that particular solutions, only, may be obtained, for instance, by the use of well known methods of numerical integration. Thus, mathematical expressions of these solutions are very complicated and at best can only be approximated.

It is accordingly another object of this invention to provide a means of converting these solutions, no matter how complex, into a pulse-time representation.

When the differential equations of motion are solved by means of numerical integration methods using available large scale electronic or analogue computers, for example, the data as obtained by such means are point solutions for the desired function and are best represented, for purposes of this disclosure, as a graph of the desired function plotted against time as the independent variable.

Using these data, a method of linear interpolation, herein defined as the "Method of Incremental Slopes," is employed in the present invention to generate the desired function as a pulse-time representation.

This method develops the function by a succession of straight lines being connected at certain predetermined values of the function. The time intervals between successive values are chosen so that nowhere in the time interval does the straight line deviate from the actual value of the function by more than a given amount. By using the predetermined values of the actual function, the slopes of the straight lines between these values are determined. A "staircase" approximation to these straight lines is then made by changing the value of the function by fixed increments at a rate which is constant for each line; the rate of occurrence of the fixed increments for each line being directly proportional to the slope of the line. The straight lines may be approximated as closely as desired by decreasing the size of the fixed increment representing the change in the value of the function.

Accordingly it is an object of this invention to provide a means of generating a pulse-time representation of any function using incremental slopes.

It is further an object of this invention to provide a means of generating a pulse-time representation of any function to any desired degree of accuracy.

Briefly, a preferred system for generating the desired function by means of the method of incremental slopes comprises a fixed frequency pulse source that feeds pulses into a first counter which is capable of resetting at any pre-selected number. This first counter sums pulses until this number is reached, then it resets automatically and starts counting immediately again from zero. Each time the first counter reaches its reset number, a function pulse is passed to the output. The rate at which the function pulses are passed to the output is inversely proportional to the reset number of the first counter. After a predetermined number of function pulses are fed out of the first counter, the reset number of the first counter is changed automatically by a selector switch. This selector switch is operated by a pulse from a second counter. The second counter is controlled in accordance with the same time pulse source which controls the first counter and is essentially an automatic timer which puts out a pulse after a certain time has elapsed. Its operation is similar to the first counter since it also resets at a pre-selected number. The reset number in this case being adjusted to be equivalent to the time interval between changes of slope, which is variable, in the incremental slope method described.

The function is developed and stored by impressing the function output pulses from the first counter onto a magnetic tape. The desired instructions for the trajectory of the missile is thus recorded on the tape and is made available to be played back as a pulse train to the control mechanisms at the time during a missile flight when automatic celestial naviagation is desired.

The above recited objects and advantages will be more fully understood by reference to the accompanying drawings illustrating the method and showing a preferred embodiment of the invention in detail.

In the drawings:

Figure 6 is a detailed schematic drawing of the function counter discriminator circuit and its associated reset and output circuits.

Figure 1:
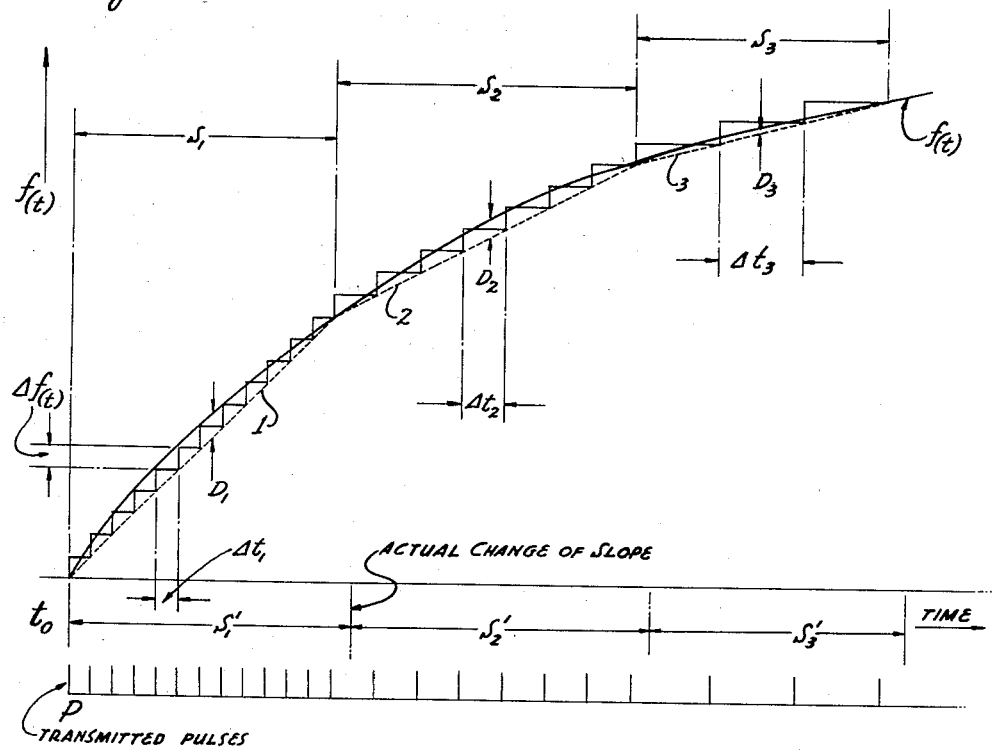
Figure 1 shows a graphical illustration of the action of the incremental slope function generator.

Referring first to Figure 1, a general function is shown as a solid line plotted against time. Knowing this function, the mathematician can approximate it to any desired degree of accuracy by means of successive straight lines of different slopes which intersect the function curve at two points. Three such straight lines or chords 1, 2, and 3 are shown as dashed lines in Figure 1. The maximum deviations of each of the straight lines 1, 2 and 3 from the actual function are designated $D_1$, $D_2$, and $D_3$. These deviations are taken in a direction parallel to the function $f(t)$ axis. Thus the maximum of all the deviations D represents the degree of accuracy of the approximation.

The incremental value $\Delta f(t)$ of the function $f(t)$ represented by each transmitted pulse P is arbitrarily selected so that the maximum deviation D is not exceeded by $\Delta f(t)$. Preferably, by first specifying $\Delta f(t)$, the time interval between successive slopes is determined so that nowhere in any time interval does the straight line deviate from the actual value of the function by more than $\Delta f(t)$.

Thus the more complicated the function or the higher the degree of accuracy demanded, the larger the number of straight lines that must be used in the approximation and the smaller the incremental value assigned to $\Delta f(t)$.

The output of the preferred embodiment of the invention for generating this function gives a pulse-time representation. It transmits a pulse P in actual physical time for each $\Delta f(t)$ change in the function. The pulse-train transmitted by the function generator is shown at the bottom of Figure 1. During the first slope the $\Delta f(t)$ changes will occur at $\Delta t_1$ time intervals, during the second slope at $\Delta t_2$ intervals, etc. Thus for a period of time $S_1$ the output pulses are spaced $\Delta t_1$ seconds apart; then for another period of time $S_2$ they are spaced $\Delta t_2$ seconds apart; etc., for the rest of the slopes of the approximating function.

Figure 2:
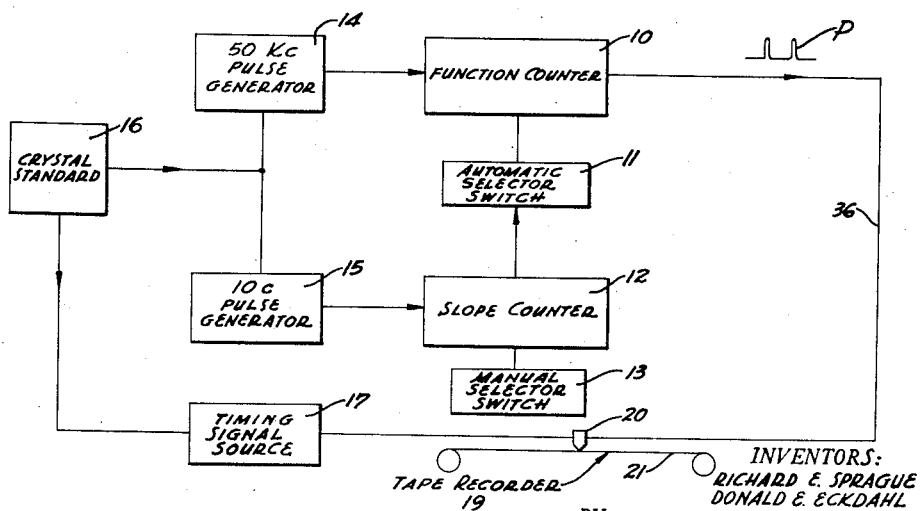
Figure 2 is a block diagram of a general set-up of a system using a preferred embodiment of the invention.

The basic electronic circuits for generating these pulses P are shown in the block diagram in Figure 2 which illustrates the general set-up of a system using a preferred embodiment of the function generator. Here two electronic circuits are used to obtain the two time quantities $\Delta t$ and S. The function counter 10 which is a five stage decade counter, produces $\Delta t$ spaced pulses which represent the function. The slope counter 12 which is a four stage decade counter produces S spaced pulses which represent lengths of slopes.

The function counter 10 is triggered with pulses from a pulse generator 14 at a rate of 50,000 cycles per second, and the slope counter 12 is triggered from a second pulse generator 15 at a rate of 10 pulses per second. Both of these pulse generators are connected to be controlled by a single crystal standard 16.

The function and slope counters 10 and 12, respectively, are similar so that the following general description broadly covers them both. Each counter counts up to some preselected number then "resets" and starts counting again from zero. Each time a counter reaches the preselected number it resets to zero. In the preferred embodiment of the invention to be described this number is a five digit number for the function counter 10 and a four digit number for the slope counter 12. Whenever one of the counters resets it transmits a pulse. The counters are so arranged that the numbers may be preselected and changed during the counting operation.

Means are provided by automatic selector switch 11 so that as many as 25 different reset numbers may be preselected for the function counter 10, i.e., set into the counter associated circuitry before starting its operation, and then automatically changed from one to the other in accordance with the timing of the pulses from the slope counter 12 into the switch 11.

The reset number for the function counter is designated as $n$. Hence it is to be noted in the present invention that the time in seconds between pulses transmitted by the function counter is $n/50,000$. Therefore $n_1$, $n_2$, etc., are chosen so that $n_1/50,000 = \Delta t_1$, $n_2/50,000 = \Delta t_2$, etc.

The reset number for the slope counter 12 is herein designated as N. Thus the time, S, in seconds, between pulses transmitted by the slope counter 12 is $N/10$; and $N_1$, $N_2$ etc., are chosen so that $N_1/10 = S_1$, $N_2/10 = S_2$, etc.

Each slope counter 12 pulse is transmitted to the automatic selector switch 11 which triggers circuits to change the $n$ of the function counter 10 to the next higher $n$. The N of the slope counter 12 is changed manually by manual selector switch 13, which is feasible since the time S is generally of several minutes duration.

The general overall operation of the setup as shown in Figure 1 and 2 is as follows:

At some time previous to $t_0$ the numbers $n_1$, $n_2$, etc., are set into the function counter 10 and its circuits adjusted at $n_1$. Likewise, number $N_1$ (actually $10S_1$) is set up in the slope counter 12.

The function and slope counters are both initially cleared to zero.

The 50 kc. and 10 c. pulses are then fed into the two counters starting simultaneously at $t_0$.

The function counter counts to its reset number $n_1$, and then resets to zero; at the same time transmitting a function pulse P. From $t_0$ to the generation of the first function pulse, the time, $\Delta t_1$, is equal to $n_1/50,000$. The function counter 10 then repeats the process, transmitting a function pulse P every $\Delta t_1$ seconds.

Meanwhile the slope counter 12 is counting at a 10 cycle rate toward its reset number $N_1$. It reaches $N_1$ after the function counter 10 has transmitted several function pulses P at the end of the $S_1$ seconds. Slope counter 12 then resets to zero and transmits a switching pulse to the automatic selector switch 11 at the same time. Switch 11 actuates to change the connections to counter 10 to change its reset number to $n_2$. Actually, to insure that the switching operation will not occur at the same time that a function pulse is being transmitted, the time $S_1$ of the slope counter is adjusted to fall half-way between the last function pulse of the first slope and the first of the second slope as shown by $S'_1$, $S'_2$, etc., in Figure 1. The counter 10 now counts up to $n_2$, resets, and counts to $n_2$ again, etc., transmitting function pulses P at $\Delta t_2$ or $n_2/50,000$ intervals. Sometime during the next slope of duration $S_2$, the reset number of the slope counter 12 is changed to $N_2$ by manual switching of manual selector switch 13. The slope counter 12 counts up to $N_2$, resets, transmits another pulse to the automatic selector switch 11 which is then activated to change the reset number of the function counter to $n_3$, etc.

The function pulses P, as shown in Figure 2, are conveyed by a function output line 36 to a magnetic tape recorder 19 comprised of a recording head 20 and a tape 21. The recording head 20 is shown to be impressed by the output from a timing signal source 17 as well as the function pulse P. The output from the timing signal source 17 is, for instance, a 50 cycle sine wave which is synchronized with the counter operation since it is controlled by the same crystal standard 16. By superimposing the function pulses P on this sine wave, a means is provided for ensuring the original temporal spacing of the function pulses P on later playback, since the recorded sine wave is used for controlling the playback speed of the tape 21.

This completes a description of the general set-up of the equipment utilizing a preferred embodiment of the present invention for obtaining a pulse-time representation of a general function.

Figure 3:
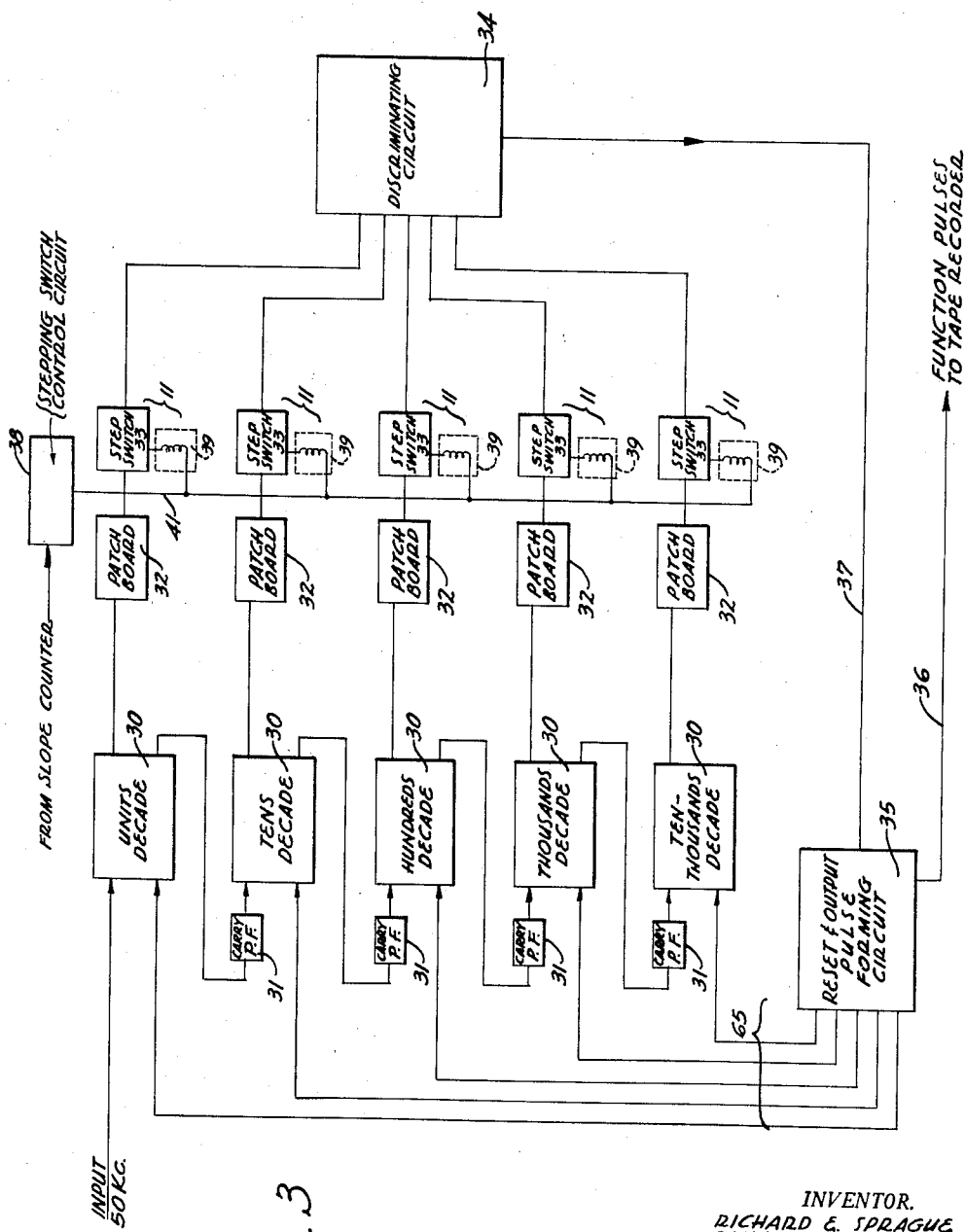
Figure 3 is a block diagram of the function counter of Figure 2.

Referring to Figure 3 a general block diagram of the function counter 10 is shown. The principle part of the function counter 10 is contained in five decade counting rings 30 which are shown in Figure 3 as the units, tens, etc., decades. The 50 kc. pulses are fed into the units decade which is the only part of the counter actually counting at this high rate. Each time the units decade reaches ten it transmits a voltage rise to a carry pulse forming circuit 31. Circuit 31 generates a narrow triggering pulse which is sent to the tens decade. Essentially, then, the units decade is counting pulses at a rate of 50,000 per second. Similarly each succeeding decade divides by ten in its counting; and each decade, except the last, has a carry pulse forming circuit 31 which sends a carry pulse to the next decade. Thus the last, or ten thousands, decade is only counting at a rate of 5 pulses per second.

A decade ring 30 has ten stable positions which correspond to the ten digits. Each decade counting ring 30 is of such a design that a control voltage may be taken from some point in the ring for each of the ten numbers of the ring. To show how this can be used in selecting $n$, assume that an $n$ of 23,456 is to be picked in function counter 10 for the first slope. Thus, $\Delta t_1$ would be $23,456/50,000$ or .46912 second. The function counter decades 30 count up to 23,456. At this point the ten thousands decade will be in its number 2 position, the thousands in its #3 position, hundreds in #4, tens #5, and units #6.

A control voltage is taken from each of the decades 30 as determined by patchboards 32 and stepping switches 33 associated with each of the decades. The control voltages from all the decades are sent into a circuit called the discriminator circuit 34. A gate in this circuit is connected to the units decade so as to "open" (or change from high to low) when the units decade reaches its number 6 position. It closes as soon as the units decade leaves the number 6 position. Similarly other gates in discriminator circuit 34, connected to each of the other decades, "open" only when their respective decades reach the numbers chosen above. This is 5 for the tens decade, 4 for the hundreds, 3 for the thousands, and 2 for the ten thousands decade.

The discriminator circuit 34 is essentially a pulse generator which generates a pulse only when all of the gates therein connected to the five decades are open simultaneously. Of course this occurs, as demonstrated above, only when the function counter decades have reached the number 23,456. When this happens the discriminator circuit 34 transmits a pulse on pulse lead 37 to trigger a reset and output pulse forming circuit 35 which feeds a properly formed function pulse to the function output line 36; and properly shaped "reset" pulses over five parallel channels 65 to each of the five decade rings 30. These reset pulses are applied to the control grids of the five decades in such a manner as to cause each of the decades to reset to its zero position.

In order that more than one $n$ may be selected in the function counter 10, each automatic selector switch 11, which comprises stepping switch 33 and solenoid 39 is a 25 position switch with circuits connected to preselected plates of its respective decade counting ring 30. During the first slope, when $n_1$ is used, the switch 33 is in position one. If $n_1$ were the number picked, as in the example above, 23,456, the gates of the discriminator circuit 34 would be connected to proper points on the decades plates to obtain control voltages as described above. When the slope counter 12 counts to the end of the first slope and transmits a pulse, this pulse is properly adapted by a stepping switch control circuit 38 to close a relay 76 (shown in Figure 6), which momentarily actuates the five solenoids 39 connected in parallel to common lead 41, to step each of the stepping switches 33 to its second position. At this time the voltages to the gates of the discriminator circuit 34 are picked from new points in the decade counting rings 30 to produce a new reset number $n_2$. The stepping switch 33 contains 25 positions so that as many as 25 different slopes can be used with the present embodiment of the invention.

For a given function, then, the switch 33 could be wired in advance and operated automatically during the production of that function. To prevent rewiring the switch for a new function, a patchboard 32 is installed between the decades and the stepping switch 33. Each new function is "plugged into" the patchboard 32 before starting the operation of producing the pulses representing this function. A more detailed explanation of the patchboard 32, automatic selector switch 11, and all other components of the function counter will be given in the ensuing description in connection with Figures 4–7.

Figure 8:
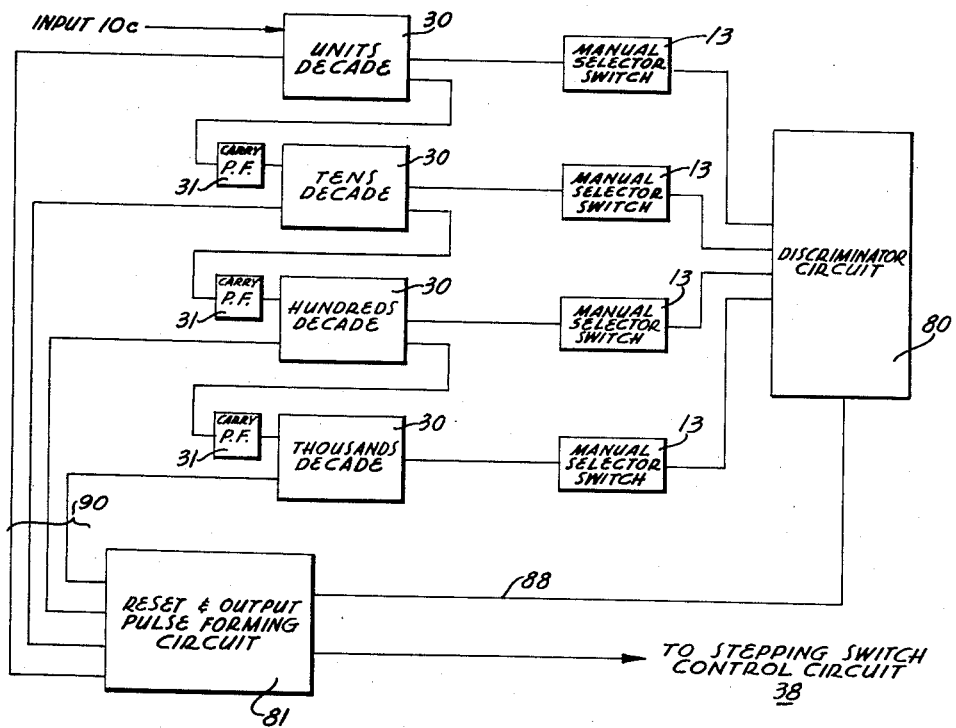
Figure 8 is a block diagram of the slope counter of Figure 2.

The arrangement and operation of the slope counter 12 is somewhat identical with that of the function counter 10, as shown in Figure 8, with the following exceptions. The input pulse frequency is 10 pulses per second. There are only four decade rings 30, and the automatic selector switch 11 and patchboard 32 are replaced therein by manual selector switches 13. Furthermore, there are variations in the slope counter discriminator circuit 80 and the reset and output circuits 81 as will be explained more fully later in connection with Figure 10.

Figure 4:
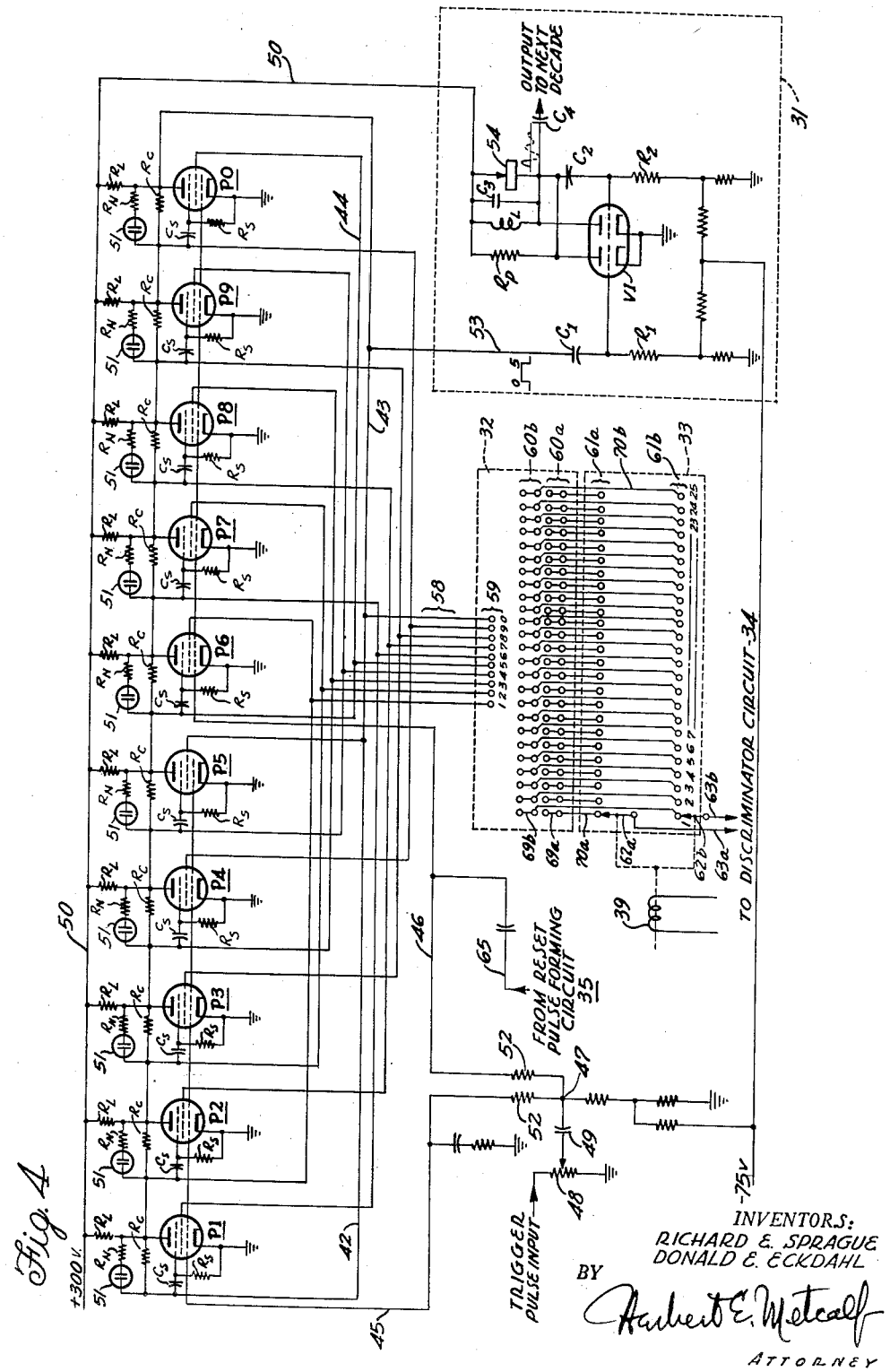
Figure 4 is a detailed schematic drawing of one of the decades of the counter and its associated circuitry.

Referring next to Figure 4, the basic counting ring decade circuit 30 is shown to be a ten pentode ring of direct coupled pairs. The numerical designation of the pentode tubes P1, P2, etc., corresponds to the digits of the decimal system. This circuit is well known in the art as a Regener counting ring and the details thereof are not a part of this invention. The basic flip-flop used in the ring consists of miniature pentodes with screens and plates interconnected in flip-flop fashion. The flip-flop circuit has two states of stable equilibrium, as is well known. Either tube may be conducting and the other will be non-conducting. In order to obtain triggering action, the circuit must be thrown from one state of equilibrium into the other by controlling the potentials of the control grids or of the suppressors. Five of these flip-flops are arranged in an endless array in Figure 4. Tubes P0 and P5, P1 and P6, P2 and P7, P3 and P8, P4 and P9 are connected as flip-flop pairs; e. g., the plate of tube P0 is directly connected by a line 43 to the screen of tube P5, and the screen of tube P0 is directly connected by a second line 44 to the plate of tube P5. It is to be noted that the plate of tube P0 is also connected by a lead 42, which is an extension of line 43, to the suppressor grid of tube P1 through a differentiating circuit comprised of condenser $C_S$ and resistor $R_S$. In this same latter manner each plate is directly connected to the suppressor grid of the next higher position tube in the ring.

The plates of each of the tubes are connected through individual equal load resistors $R_L$ to a common positive line 50 carrying +300 volts, and the cathodes of all the tubes are directly connected to ground.

All ten control grids of the tubes are tied together by a first grid line 45, connected to the first five control grids in series; and a second grid line 46, connected to the last five control grids in series. The lines 45 and 46 are then connected through individual series grid resistors 52 to a common junction 47.

Positive triggering input pulses are fed to this junction 47 through a grounded input variable resistor 48 and an input capacity 49 in order to change the condition of the counter.

At any time under static conditions, five of the tubes will be conducting and their associated flip-flop tubes non-conducting. A random distribution of on and off tubes would occur were it not for 10 coupling resistors $R_C$ between adjacent plates. These resistors $R_C$ insure that 5 adjacent tubes will be on and the opposite 5 tubes off by providing means for transfer of relatively high potential from the plate of one pentode to relatively low potential on the plate of a conducting adjacent pentode. For instance, consider a random distribution in which tubes P0 and P2 are off and tube P1 is on. In this case, plates of tubes P0 and P2 would be high in potential and plates of tubes P5 and P7 would be low in potential owing to current flow therethrough. The resistors $R_C$, coupling plates P1, to P0 and P2 will raise the potential of plate of tube P1 because effective plate circuit resistance is lowered, owing to parallel resistor combination $R_C$ and $R_L$ thereby decreasing the voltage drop across plate resistor $R_L$ and consequently effecting a net increase in plate potential. Similarly the resistors $R_C$ coupling plate of tube P6 to plates of tubes P5 and P7 will lower the potential of plate of tube P6 because connections from plates of conducting tubes P5 and P7 via resistors $R_C$ effect a current flow through plate resistor $R_L$ and a consequent potential drop on plate of tube P6. Since tubes P1 and P6 are connected in flip-flop, the net effect will be to turn tube P1 off and tube P6 on. Thus, the desired pattern of five consecutive tubes off and the remaining five consecutive tubes on, is provided for.

To describe what happens in the counting action, assume that, initially, tubes P1 through P5 are on and P6 through P0 are off. This is the adopted zero condition for the decades of the counters 10 and 12 used in the function generator. A positive triggering input pulse on all the ten control grids will have no appreciable effect on tubes P1 through P5 since they are already on. A negative pulse is produced at the plate of each of the off tubes P6 through P0. These negative pulses are transmitted, as before noted, to the suppressor grids of tubes P7 through P1 through differentiating circuits comprising capacitor $C_S$ and resistor $R_5$. Tube P1 has a negative pulse on its suppressor and a positive pulse on its control grid. Tube P6, which is in flip-flop arrangement with P1 has a positive pulse on its control grid and no pulse on its suppressor. The tubes P0, P1 and P5, P6 (at the break between on and off tubes) are most easily triggered because of the coupling resistors $R_C$. All these conditions combine to cause flip-flop pair P1 and P6 to flip, turning tube P1 off and tube P6 on. The condition is now, tubes P2 through P6 on and tubes P7 through P1 off, which is the conventionally adopted number one position of the counter. Since the circuit is completely symmetrical the next triggering pulse will produce the same effect turning tube P2 off and P7 on. Thus successive triggering pulses will step the position of the five conducting tubes one tube around the ring for each pulse.

The decade ring counter 30 is thus actually a circuit with ten stable positions. The position of the decade is indicated by the conduction status of neon lamps 51 connected between adjacent plates; a resistor $R_N$ is wired in series with each of neon lamps 51. At the two points in the circuits where adjacent tubes are on and off, a potential difference exists large enough to "fire" the neon lamps 51 between adjacent plates. For instance, when the decade is in its zero position the lamps 51 between plates of tubes P5, P6, and P1, P0 will glow. Arbitrarily, the one between P1, P0 is designated as the zero light. A neon glow lamp 51 has two elements either of which will collect neon gas ions and produce a glow at its surface. The lamp will glow on one element with one polarity and the other element with the other polarity. The zero lamp 51 will glow at the zero and five positions of the decade. The lamp is inserted behind the panel so as to have the front half glowing in the zero position. When observed through a hole in the panel the lamp glows much brighter in the zero position.

Each of the decades 30 in the function and slope counters 10 and 12 is a ring of ten counter almost identical with the one shown in Figure 4.

In order to derive a carry pulse from each decade for every ten input pulses to that decade a carry pulse forming circuit 31 is provided. The width and amplitude of pulses needed to trigger decades following the first are sufficiently uncritical to permit the use of a fairly standard pulse forming circuit 31 known as a ringing circuit. A schematic diagram of this circuit is shown to the right in Figure 4.

The voltage at the plate of the zero tube P0 in a decade ring counter will vary with time. As the ring reaches its zero position the P0 plate rises suddenly as the zero tube P0 changes from on to off. When the ring reaches the five position the plate voltage drops again as the tube conducts. The net effect is substantially a square wave as shown along line 53 connecting the carry pulse forming circuit 31 to the plate of tube P0. The positive jump is the only part of this wave form needed. The condition at zero when the ring has counted ten pulses is the one needed to produce a carry triggering pulse to the next decade.

At the input to circuit 31, a condenser $C_1$ and a resistor $R_1$ differentiate this input square wave so that at the left grid of double triode tube V1 the voltage appears as a steep wave. Tube V1 is biased enough negative so that all but the positive pulses are clipped. The voltage output at the left plate of tube V1, which is connected to the positive source of potential line 50 through plate load resistor $R_P$, is thus a steep negative pulse.

A condenser $C_2$ and a resistor $R_2$, transmits this negative pulse to the right grid of tube V1. The right plate load of tube V1 is connected to positive line 50 through an inductance L, shunted by a condenser $C_3$ and a crystal diode 54. Before the negative pulse hits the right grid of tube V1, the tube current flows through inductance L. When the pulse from the left plate cuts the right grid off suddenly, the current in inductance L, which cannot change instantaneously, begins to circulate in the tank circuit formed by inductance L and capacity $C_3$. This would ordinarily produce an oscillatory voltage across industance L damped only by the resistance in its coil. An examination of this oscillation shows that the first half sine wave is positive. The crystal diode 54 damps out all but the first half sine wave and this is transmitted as a positive triggering carry pulse through output condenser $C_4$ to the next decade. This completes the description of the carry pulse forming circuit 31.

The control voltages described above which are applied to the discriminator gate circuit 34 are actually the voltages appearing at the plates of the tubes in the various decades. Using the example described above, suppose the function counter 10 reset number $n$ is 23,456. Control voltages are needed to indicate when the units decade is at position #6, when the tens decade is at number 5, hundreds at 4, thousands at 3, and ten thousands at 2. By reference to Figure 4 it can be ascertained that for each number position in a decade ring there are five adjacent plates whose plate voltages are low, namely the conducting tubes. Of the five, the two outside tube plates are low when, and only when, that particular number occurs. Further examination of the ring will show that if the number position is, for instance, 2, plate 3 and 7 will both be low only when the decade is in the number 2 position; plates 4 and 8 in number 3, etc. The following table summarizes these control voltages which will be the ones used for controlling the gates in the discriminating circuit 34. Because the units decade counts at a higher rate than the other decades and is the last of the dacades to reach its preselected digit, the arrangement of the control voltage for the units decade, as used in the discriminator circuit 34, is different from the others as is shown in the following table and will be more clearly explained in the ensuing discussion.

TABLE
*Decade control plates*

| No. | All Decades Except Units Control Plates | Units Decade Control Plates |
|---|---|---|
| 0 | 1 and 5 | 0 |
| 1 | 2 and 6 | 1 |
| 2 | 3 and 7 | 2 |
| 3 | 4 and 8 | 3 |
| 4 | 5 and 9 | 4 |
| 5 | 6 and 0 | 5 |
| 6 | 7 and 1 | 6 |
| 7 | 8 and 2 | 7 |
| 8 | 9 and 3 | 8 |
| 9 | 0 and 4 | 9 |

As further shown in Figure 4, voltages on each of the plates of the tubes in the decade ring are connected by individual control leads 58 to ten terminals 59 on patchboard 32. The ten terminals 59 are connected with patch cords (not shown in Figure 4) to two sets of contacts 60a and 60b on patchboard 32. Each set has a double row of interconnected contacts with 25 contacts per row. These patch cord connections are changed when a new function is to be generated.

One set of contacts 60a of the patchboard are connected to 25 upper stepping contacts 61a of the stepping switch 33; and the other set of contacts 60b of the patchboard are interconnected to 25 lower stepping contacts 61b of the switch 33. In a manner which will be more clearly described later, each actuation of stepping switch 33 by solenoid 39 steps switch contact arms 62a and 62b to successive contacts of the switch 33. Thus voltage lines 63a and 63b connected to the contact arms 62a and 62b transmit to the discriminator circuit 34 the two preselected control voltages which define the digit of the decade desired for a reset number.

The slow rate of counting of the ten thousands decade precludes that at least some of the control voltages must be square waves of long duration, i.e., D.C. voltages. Thus control voltages from the last four decades are directly coupled to the gate tubes in the discriminator circuit 34 (Figure 6). However, for the units decade a pulse train is derived and sent to the circuit 34.

Figure 5:
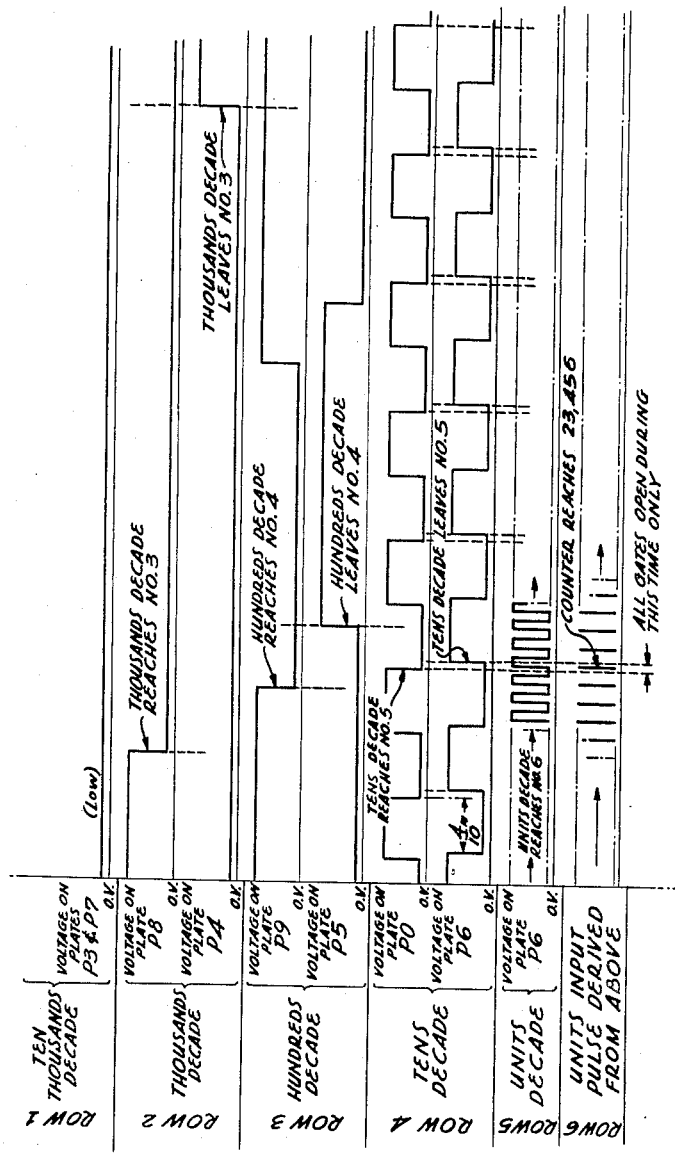
Figure 5 is a chart showing the control voltages from the decades as applied to the gates in the function counter discriminator circuit.

To clarify the situation, refer first to Figure 5. Here are shown the wave forms at the various control plates in the five decades plus a pulse wave derived from the units decade. These wave forms are for the reset number 23,456.

Since the ratio of the square wave frequencies between decades is 10 to 1, the complete cycle of the ten-thousands decade control plate in row 1 is not shown. Therefore, it is best to start the explanation with the tens decade in row 4 of Figure 5. It will be seen that the voltage on the two control plates of tubes P0 and P6 of the tens decade differ by $4/10$ of a cycle in phase. The reason for this is made clear from the previously described operation of the decade ring counter. Thus both plates are low only during the time interval shown between the dotted lines in row 4, which is the time that the decade spends in its number 5 position. Similarly, the hundreds decade control voltages are both low only between the times indicated by the dotted lines in row 3 of Figure 5. The thousands and ten thousands decades control voltages are shown as being low over most of the diagram in rows 2 and 1, respectively, but they follow the same pattern.

These 8 control voltages (two from each decade are all low only when the last four decades are on the numbers 2, 3, 4 and 5, respectively. This time is indicated at the bottom of Figure 5 (between dotted lines).

The units decade control voltages on the plates are not square enough (due to distributed capacity effects) to act as control voltages without some improvement on wave form. It is not necessary to use a gate control voltage from the units decade as can be seen from Figure 5. Instead, a pulse is derived from the control plate concerned in the units decade by using a pulse former similar to the pulse former 31 described in Figure 4. This resultant pulse wave form is shown in row 6 of Figure 5. At plate of tube P6 the voltage rises abruptly when the units decade reaches number 6. The pulse is produced at this instant. It can be seen that the only time this pulse occurs simultaneously with the opening of all of the control gates from the other decades is when the counter reaches 23,456.

Referring now to Figure 6, a schemtic diagram of the discriminator circuit 34 is shown. Each of eight control voltages from the last four decades, for the example given, are applied through individual series grid resistors $R_7$ to one of the control grids of the four double triode tubes V2, V3, V4, and V5. These tubes have a common plate load resistor $R_5$ connected to positive line 50, and a common cathode bias $R_6$. The bias resistor $R_6$ is enough positive so that when any control voltage is low the triode is cut off. The triodes conduct at saturation when the control voltages are high, the series grid resistors $R_7$ preventing grid current flow. The plate load resistor $R_5$ is high compared to the plate resistance of any one triode, so that the plate voltage is low and changes very little as long as any one triode is conducting. However, when all triodes are cut off their plate voltages rise to the +300V in positive line 50. This will happen, for the example described, when the last four decades are on their respective reset numbers 2, 3, 4 and 5.

The voltage from plate of tube P6 of the units decade is applied through a differentiating network comprising capacitor $C_8$ and resistor $R_8$ to a pulse forming double tube $V_7$. Since this particular circuitry is the same as the carry pulse forming circuit 31, like notations have been given to the remaining elements, and will not be further described here. As before, the output from the ringing circuit is a positive half sine wave pulse. This pulse is connected thru a coupling condenser $C_5$ to be applied to the second control grid of a discriminator tube V8; and the high positive potential from the plate of tubes V2, V3, V4, V5 is applied through a plate line 69 to the first control grid of V8. Both control grids of V8 are cut off except when the plate potential of the gate tubes and the pulse occur. The first control grid of V8 is kept cut off by the bleeder network resistances 64 from the plates of V2 thru V5 to the −75V. in low potential line 56. When the plate voltage of the tube gates is low, the #1 grid of V8 is below cut off. When the plates rise to +300V the #1 grid of V8 rises to zero potential.

The #2 grid of multigrid tube V8 is returned to a cut off bias and is driven to zero potential by the ringing circuit pulse. If either control grid of multigrid tube V8 is cut off, there is no output at its plate. When the last four decades reach their reset numbers the plates of V2 thru V5 rise to −300 volts and the first grid of V8 rises to zero. Then when the next pulse occurs at the time the units decade reaches six, it is amplified and appears at the plate of V8 as a negative, narrow pulse. Thus the discrimination of when the function counter reaches its reset number is accomplished by gate tubes V2 thru V5, V7 and V8.

Referring back to Figure 4, it is recalled that all ten control grids are connected together and pulsed with common positive triggering pulses. In order to reset each decade to zero the ten grids are split into two groups of five each. The triggering pulses are applied to each of the ten grids through series grid resistors 52, which have no effect as long as no grid current flows, except as they effect the time of charge and discharge of the total grid to cathode capacity of five tubes. The resultant input triggering pulse amplitude is the same at all ten grids and counting takes place normally. A negative pulse is applied directly to grids P6 thru P0, via reset line 65 and second grid lead 46, whenever resetting is desired. The amplitude of this pulse is greatly reduced at grids of tubes P1 thru P5 by the dividing network resistor $R_s$, and as a result, tubes P6 thru P0 are turned off by this negative pulse and tubes P1 thru P5 are turned on, no matter what position the decade was in before the pulse occurred.

Referring again to Figure 6, the pulse generated by the discriminator circuit 34 at the plate of tube V8 is to be used to cause the 5 decades to reset to their zero positions. The units decade is counting at a rate of 50 kc. which means that the triggering pulses are 20 $\mu$secs. apart. About two or three $\mu$secs. are required to change the plate voltage on a tube in the units decade from low to high or vice versa. Also, the triggering pulses must have a certain minimum width to make the counting action occur. This width is about 2 $\mu$secs. Any resetting action in the first decade must take place between the pulse which triggers the decade to its selected reset number and the next triggering pulse, 20 $\mu$secs. later.

The method used to reset the units decades requires a narrow reset pulse of a definite minimum width of about 2 to 3 μsecs.

It would seem that a narrow pulse applied to the rest of the decades would produce the reset action correctly, although the time limit is not so stringent. Examination will show however, that difficulties arise in case a narrow reset pulse is used because of the delays inherent in carry pulses between stages. Thus a reset pulse is used in the last four decades which is wide enough to encompass any extra carry pulse between decades that might occur.

The output and reset pulse forming circuit 35 which sends pulses of the proper widths and shapes to reset the decades in view of the difficulties recited above will next be described. Referring to the middle of Figure 6, the circuit 35 shown amplifies and reforms the pulse, in pulse lead 37, from the discriminator circuit 34 and sends pulses to each of the decades to send the decades to zero. A coupling circuit $C_9$, $R_9$, connected to pulse lead 37, feeds the discriminator circuit output pulse to the left grid of double triode V9 which amplifies and inverts the negative input pulse and feeds a positive pulse to the control grid of the right half of V9 through a grid condenser $C_{10}$ and a variable resistor $R_{10}$. The right half of V9 amplifies and inverts this pulse and transmits a narrow negative pulse to the units decade line 65 for resetting. Thus the narrow reset pulse required by the units decade is provided.

The output positive pulse from the left plate of V9 is also conveyed to the left grid of a double triode tube V10 through $C_{11}$. V10 is a pulse forming device, known as a one-shot multivibrator, which produces a wide pulse on its right plate from a narrow input pulse on its left grid. Its operation occurs as follows: Initially, the left hand triode section of V10 is cut off by the cathode voltage produced by the current flowing through the right-hand triode section which is conducting at saturation current. A positive pulse on the left grid produces a slight drop in left plate voltage which is transferred to the right grid through capacitor $C_{13}$. This produces a small decrease in current through the right tube lowering the cathode voltage slightly. The lowered cathode voltage appears as a further increase in the left grid voltage. This action repeats causing the tubes to flop, with the right grid driven much below cut off and the left grid at saturation potential. The right plate rises to $+300$ volts. The tube V10 remains in this condition until the condenser $C_{13}$ has discharged thru resistor $R_{13}$ enough to bring the right grid back above cut-off. At this point the action reverses and the tubes flop back to their static conditions. The right plate falls to its low voltage again. The result at the right plate is a positive pulse about 50 μsecs. wide. The pulse width is determined largely by capacitor $C_{13}$ and resistor $R_{13}$ since they form the time constant of the discharge of capacitor $C_{13}$.

This wide pulse from the right plate of V10 is transmitted to four control grids through individual condensers, like condenser $C_{12}$, and variable resistors, like resistor $R_{12}$. The grids in question are the left grid of buffer tube V12, the right grid of V11, and the grids of single triodes V13 and V14. Each of these control grids is connected to an intermediate point of one of the variable resistors, like resistor $R_{12}$. The use of variable resistors, $R_{12}$ enables the grid bias to be adjusted to cause the negative pulses at the plates to be of the proper amplitude as needed to properly reset the decades.

Thus, all the triodes referred to amplify and invert the wide pulse and feed a negative pulse onto one of the reset pulse lines 65. Lines 65 connect to reset grids of tubes P6 thru P0, of each of the decades, as shown for one decade in Figure 4. The latter tubes referred to also function to isolate the impedances feeding the separate decades.

In addition to feeding the wide pulse from V10 to the above referred to buffer tubes, this pulse is also transmitted to the left half of tube VII through a condenser $C_{14}$. This tube functions as a cathode follower and serves to transmit a pulse from its cathode. This pulse is the function output pulse desired and is led by a low impedance line 36 to tape recorder 19 which develops and stores the function for later playback.

The initial clearing to zero of all the decades before the production of a function occurs, is accomplished by a push button 67 which temporarily grounds the plate of V8 through a pushbutton resistor 68. This generates an "initial clearing" reset pulse at the same point that the normal reset pulse appears, and of the same polarity and amplitude.

Figure 7:
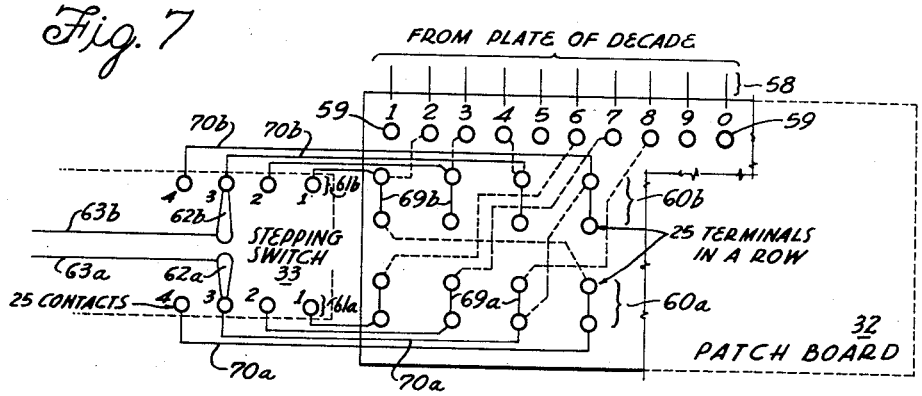
Figure 7 is a partial detailed schematic of the patch board and automatic stepping switch.

Referring next to Figure 7, the wiring connections between a single decade 30, a patchboard 32, and a stepping switch 33 is shown. Ten control leads 58 connect each of the plates of the decades to one of the 10 terminals or plug-in-holes 59 on the patchboard 32. Patchboard 32 has two sets 60a, 60b of terminals, each set having a double row of terminals with 25 per row. In each set, corresponding terminals, of the 25 in each row, are shorted together by shorting lines 69a, 69b.

One of the sets of terminals 60a then has each of its 25 terminal pairs connected by wires 70a to one of the 25 successive contacts on row 61a of the stepping switch 33. The other set of terminals 60b is connected in the same manner by wires 70b to the 25 contacts on row 61b of switch 33. For simplicity only four contacts per row are shown in the diagram of Figure 7.

Each of the last four decades of the function counter 10 has a patchboard 32 and a stepping switch 33 with connections as shown. The first decade has a similar patchboard and switch except that only two rows of patchboard terminals and a single row of switch contacts are needed.

The stepping switch arms 62a, 62b, are all placed on the number one controls initially. When the second slope starts, the arms 62a, 62b, of all decades are stepped to the number 2 contact; third slope to number 3 contact; etc.; up to 25 slopes. For a given function the reset numbers are calculated, from these the proper plates to give gate control are determined and the patchboard connections are made with patchboard plug-in wires. For example, suppose the first four reset numbers to be 11111, 22222, 33333, 77777. In this case, for any one of the four slopes, the connections to the last four decades will all be the same. They will be plates 2 and 6, 3 and 7, 4 and 8, 8 and 2 respectively. These connections are shown in Figure 7 by the dotted lines. The reason for two rows of terminals shorted together is demonstrated by the need here for two connections each to plates 2 and 8. The second connection to plate 2 is made to the terminal below the one first connected to plate 2. In this manner all 25 terminals could be connected to the same plate. The connection to the units decade are made to only one plate per slope. They are plates 1, 2, 3, and 7, respectively. The final output from all the stepping switches 33 is then a total of 10 control voltages which are transmitted to the discriminator circuit 34 on voltage lines 63a, 63b as previously described. For each new function, new patchboard 32 connections are plugged in.

The stepping switch 33 on each decade is actuated by a solenoid 39, operating a rachet wheel (not shown). The solenoids 39 are actuated by D.C. power and they will operate in a small fraction of a second. Each time D.C. power is removed from a solenoid 39 is pushes the rachet wheel around one position and the rotary switch arms 62a and 62b move one contact. The power for the switch operation is derived from the D.C. source 75 (see Figure 6). The D.C. voltage is applied and removed from the solenoids 39, which are connected in parallel, by the opening and closing of relay 76 shown in the stepping switch control circuit 38.

In circuit 38, shown in Figure 6, the relay 76 is in the plate circuitry of the right triode section of V12 tube. The length of time the relay 76 remains closed is not too critical but it must be much longer than the duration of the output pulse from the slope computer 12, since the solenoids are preferably spring loaded. Therefore another one-shot multivibrator V15, similar to V10, is used to widen the pulse. The right section of tube V15 is cut off normally and the one-shot pulse from the left plate of V15 causes the tube V12 to conduct fully, closing the relay 76 for the proper time. The five solenoids 39 for the five decades are connected in parallel to common lead 41. They step their respective switches 33 one position each time the relay 76 closes and opens. This completes the description of the stepping switch control circuit 38.

Referring again to Figure 8 it is shown there that the circuits of the slope counter 12 are quite similar to the function counter 10. The four decades 30 and the three carry pulse forming circuits 31 are the same as the ones described for the function counter with minor differences in circuit constants due to the much lower frequency of counting.

However, the patchboard and automatic stepping switches of the function counter are not needed in conjunction with slope counter 12. They were needed in the function counter because the reset number there had to be changed in the very short time between function pulses, which may be as low as .4 second. The slope counter 12 reset number N on the other hand may be changed anytime during a slope; this can be done by an operator manually using manual selector switch 13, since the length of the slope will usually be at least a few minutes. Further, the slope counter discriminator circuit 80 and the reset and output pulse circuit 81 are different from the function counter circuits and will be described in the ensuing discussion.

Figure 9:
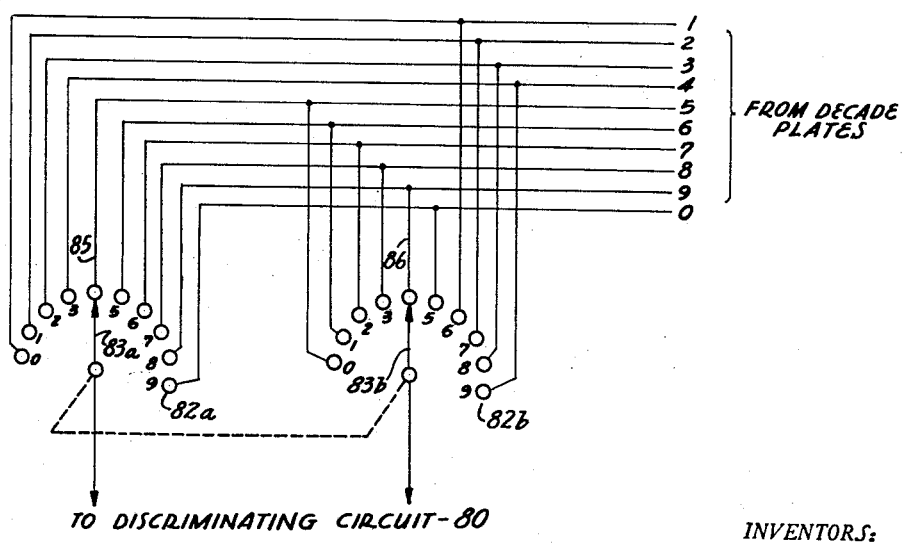
Figure 9 is a schematic drawing of the manual selector switch used in conjunction with the slope counter.

Referring first to the manual selector switch 40 for the slope counter 12, as shown in Figure 9, it is seen there that two sets 82a, 82b of contacts of the switch are connected to the ten plates of one of the four decades. It has previously been noted that the voltages from two plates is required to define a number position of the decade ring. It can be seen from Figure 9 that the connections are made so that the numbering of the contacts of sets 82a and 82b correspond to the number position desired. The reset number for each decade is thus selected by turning the manual switch arms 83a, 83b to the number marked on the sets of contacts 82a, 82b. The switch is shown in the drawing in the number four position. Connections there are made of plates 5 and 9 of the decades by plate lines 85 and 86, and the control voltages, picked off of those plates for reset at number four (see table), are transmitted to the slope counter discriminator circuit 80. Since the input frequency is 10 cycles, the time of one slope can be read directly from the four switches on the decades in seconds and tenths of seconds.

Figure 10:
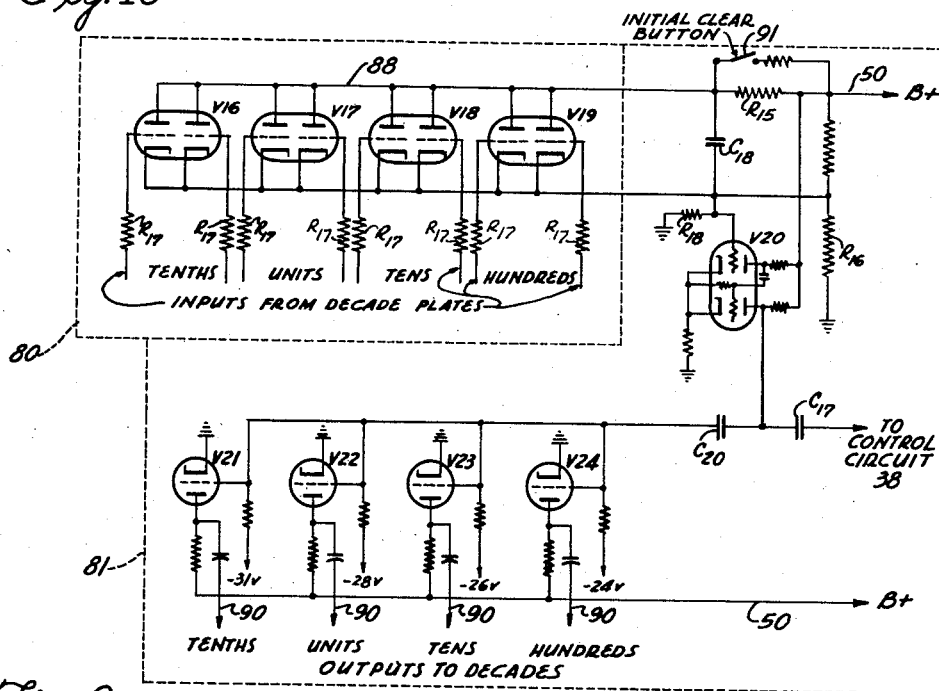
Figure 10 is a detailed schematic drawing of the slope counter discriminator circuit and its associated reset and output circuits.

The slope counter discriminator circuit 80 is relatively simple and will next be described. In Figure 10 four twin triodes V16, V17, V18 and V19 are shown to be used in the same manner as they are used for the last four decades of the function counter 10. These tubes all have a common plate load resistor $R_{15}$ connected to positive line 50 and a common cathode bias $R_{16}$ connecting to ground. The eight control voltages from the four decades are applied to the grids of these tubes through individual grid resistors $R_{17}$. Only when all eight control voltages are low does a positive rise, to the positive potential in line 50, appear at the common plate line 88. This completes the description of the discriminator circuit 80 for the slope counter 12.

The output and reset pulse forming circuit 81 for the slope counter shown in Figure 10 consists essentially of a one-shot multivibrator tube V20, similar to V10 and V15 in Figure 6, and four buffer tubes V21 thru V24. The rise on the common plate line 88 of discriminator circuit 80 is transmitted to the top grid of twin triode tube V20 as a steep pulse due to the differentiating action of capacitor $C_{18}$ and resistor $R_{18}$. One-shot multivibrator tube V20 generates a properly widened positive pulse at its lower plate. This pulse is transmitted to the function counter stepping switch control circuit 38 through an A.C. coupling condenser $C_{17}$, and to the grids of tubes V21 thru V24 through a condenser $C_{20}$. The negative pulse generated at each plate of these latter buffer tubes is sent back to each of the decades of the slope counter over reset lines 90.

It should be noted that, for the slope counter, the reset pulse is formed directly from the occurrence of a pulse at the plates of V16 through V19 rather than by passing of a pulse by a discriminator tube as in the function counter. This is possible since the pulse widths are not so critical for the slow counting action of this counter.

Initial clearing of the slope counter 12 is accomplished, in this case as before, by momentarily connecting the common plates of tubes V16 thru V19 to the positive potential in line 50 thru an initial clear button 91. This produces a pulse at the grid of the multivibrator V20 of the same polarity and amplitude as a standard reset pulse.

It should be noted that the approximating lines or chords are shown in Figure 1 with ends of the lines meeting the curve $f(t)$ of the function. Since it is desirable to make each line as long as possible without exceeding the tolerable error in the function, a simple method for extending the time intervals S of the slopes is essentially that of using extended chords which results in plus and minus deviations D. Thus maximum advantage of the method of linear approximation is obtained resulting in a simplification of the initial set up of the function in the generator.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A function generator for generating a function of time comprising a source of time pulses, a first counter which sums time pulses from said source, means for setting predetermined numbers in said first counter, means for clearing said first counter each time its predetermined number is reached, means for generating a function pulse each time said first counter clears, a second counter which sums time pulses from said source, means for setting predetermined numbers in said second counter, means for clearing said second counter when its predetermined number is reached, means for operating on said means for setting predetermined numbers in said first counter when said second counter clears, said latter means being operable for setting predetermined numbers in said second counter while said second counter is counting to said latter predetermined numbers.

2. A function generator comprising a first counter, a first switching means for detecting a reset condition of said first counter, a pulse generator feeding pulses into said first counter, means for resetting said first counter to zero and generating a function output pulse when reset condition is attained, a second counter, a second switching means for detecting a reset condition of said second counter, said pulse generator simultaneously feeding pulses into said second counter, means for resetting said second counter to zero and actuating said first switching means to detect a new reset condition in said first counter when said second counter reaches its reset condition, and actuating means for said second switching means to alter the reset condition detected in said second counter.

3. A function generator comprising a high frequency pulse generator, a first counter which sums the pulses from said high frequency pulse generator, a first switching means for detecting a condition corresponding to reset numbers in said first counter, means for clearing said first counter each time its reset number is reached, means for generating a function pulse each time said first counter clears, a low frequency pulse generator, a second counter which sums the pulses from said low frequency pulse generator, a second switching means for detecting a condition corresponding to reset numbers in said second counter, means for clearing said second counter when its reset number is reached, and means for actuating said first switching means when said second counter is cleared, and means whereby an operator can actuate said second switching means after said second counter is cleared.

4. A function generator comprising a high frequency pulse generator, a first counter which sums the pulses from said high frequency pulse generator, a first switching means for detecting a condition in said first counter corresponding to a reset number, means for generating a function pulse and clearing said first counter each time its reset number is reached, a low frequency pulse generator, a second counter which sums the pulses from said low frequency pulse generator, a second switching means for detecting a condition in said second counter corresponding to a reset number, means for automatically actuating said first switching means and clearing said second counter when its reset number is reached, said second switching means being of the type capable of manual changing while said function pulses are being generated by said first counter.

5. Apparatus in accordance with claim 4 wherein a crystal standard controls both said high frequency and said low frequency pulse generators, and both said counters start counting at the same instant of time.

6. An electronic function generator comprising a first source of time pulses, a first counter counting said time pulses, automatic selector means for detecting a reset condition in said first counter, means for resetting said first counter when its reset condition is reached, means for generating a function pulse when said first counter resets, a second source of time pulses, a second decade counted counting said time pulses, a manual selector means for detecting a reset condition in said second counter, means for resetting said second counter when its reset number is reached, means for actuating said automatic selector means to provide a different reset condition in said first counter when said second counter resets, and means permitting a manual changing of the reset number of said second counter while said function pulses are being generated.

7. An electronic function generator comprising a first source of time pulses, a first decade counter counting said time pulses, automatic selector means for detecting a reset condition in said first counter, means for indicating when a reset number set in said first counter is reached, means for resetting said first counter when its reset condition is reached, means for generating a function pulse when said first counter resets, a second source of time pulses, a second decade counter counting said time pulses, a manual selector means for detecting a reset condition in said second counter, means for indicating when a reset condition set in said second counter is reached, means for resetting said second counter when its reset condition is reached, means for actuating said automatic selector means for detecting a reset condition in said first counter when said second counter resets, and means for manually adjusting said manual selector means for changing the reset condition of said second counter.

8. An electronic function generator comprising a source of time pulses, a first counter counting pulses from said source and having a plurality of stages, output voltage lines from each of said stages corresponding to the digits of said stages, automatic stepping switches associated with each of said stages and having successive contacts thereon connected to preselected voltage lines of said stages such that said connections correspond to reset numbers for said first counter, a stepping switch control circuit, a first discriminating circuit having a gate for each stage of said first counter, said gates controlled by said preselected voltage lines, said gates simultaneously open only when the reset number as determined by said automatic stepping switches is reached by said first counter, first pulse forming circuits for generating clear pulses to be sent to each stage and for generating a function pulse each time all said gates are open, a second counter counting pulses from said source and having a second plurality of stages, voltage leads from each of said latter stages corresponding to the digits of said stages, manual selector switches associated with each of said latter stages and having successive contacts thereon connected to said voltage leads, a second discriminating circuit having a gate for each latter stage, said gates in said second discriminating circuit simultaneously open only when a reset number as determined by said manual selector switches is reached by said second counter, second pulse forming circuits for generating clear pulses to be sent to each latter stage and for generating a pulse to be sent to said stepping switch control circuit to actuate said automatic stepping switches.

9. Apparatus in accordance with claim 8 wherein said first pulse forming circuits comprise a differentiating circuit feeding the grid of a triode for generating a narrow pulse to be sent to the first stage of said first counter, a one-shot multivibrator for generating a wide pulse to be sent to each of said other stages of said first counter, and a cathode follower for generating a low impedance function pulse.

10. Apparatus in accordance with claim 8 where said second pulse forming circuit comprises a one-shot multivibrator for generating a wide pulse to be sent to said second counter stages and to said stepping switch control circuit.

11. Apparatus in accordance with claim 8 wherein said stepping switch control circuit comprises a one-shot multivibrator, a relay gate comprising an electron tube having its control grid impressed by the output from said one-shot multivibrator, a relay in the plate circuit of said relay gate, stepping switch coils for each of said stepping switches connected in parallel, a D.C. source, said relay connecting said D.C. source to energize said stepping switch coils whenever a pulse from said one-shot multivibrator permits the relay gate to conduct.

12. Apparatus in accordance with claim 8 wherein a plug-in connecting board is connected between said voltage lines and contacts of said stepping switches.

13. An electronic circuit for indicating when a counter having a plurality of stages reaches a preselected number comprising a single output lead connected from each of said stages to an output terminal corresponding to the digits of said stages, a gate comprising an electron tube for each stage, all said gates comprising electron tubes connected in parallel across a common potential and having a common plate line, preselected voltage lines from each of said stages controlling their respective gates, a pulse output generated at the common plate line of said gates only when all said gates are simultaneously open.

14. An electronic circuit for indicating when a counter having a plurality of stages and counting high frequency pulses reaches a condition corresponding to a reset number in said counter comprising output voltage lines from each of said stages corresponding to the digits of said stages, a control gate comprising an electron tube for each stage but the units stage connecting respectively with preselected output voltage lines corresponding to digits of said reset number, said control gates connected in parallel across a common potential and having a common plate output line generating a pulse output thereon when all said gates are simultaneously open, a discriminating gate comprising an electron tube having two control grids, one of said control grids connecting with a preselected voltage line from said units stage and said common plate output line connecting with the other of said control grids, whereby said discriminating gate passes a pulse only when both said control grids are energized to indicate said counter condition is reached.

15. Apparatus in accordance with claim 14 including a ringing circuit connecting said units stage preselected voltage line to one of said control grids.

16. Apparatus in accordance with claim 14 wherein a common plate load resistor is connected to the common plate output line of said control gates, said plate load resistor being high in magnitude compared to the magnitude of plate resistance of any one of said gates so that the plate voltage is maintained at a low and constant magnitude as long as any one control gate is conducting.

References Cited in the file of this patent

UNITED STATES PATENTS

| | | |
|---|---|---|
| 2,443,198 | Sallack | June 15, 1948 |
| 2,490,500 | Young | Dec. 6, 1949 |
| 2,500,294 | Phelps | Mar. 14, 1950 |
| 2,563,106 | Eugley et al. | Aug. 7, 1951 |

OTHER REFERENCES

Predetermined Counters, J. J. Wild, Electronics, March 1947, pp. 120–123.

Predetermined Counter for Process Control, R. J. Blume, Electronics, February 1948, pp. 88–93.